US008865104B2

(12) United States Patent
Frink et al.

(10) Patent No.: US 8,865,104 B2
(45) Date of Patent: Oct. 21, 2014

(54) METHOD AND APPARATUS FOR PRODUCING HIGH YIELDS OF CARBON NANOSTRUCTURES

(71) Applicant: Kevin M. Frink, Wilmington, NC (US)

(72) Inventors: Kevin M. Frink, Wilmington, NC (US); Bentley D. Frink, Wilmington, NC (US)

( * ) Notice: Subject to any disclaimer, the term of this patent is extended or adjusted under 35 U.S.C. 154(b) by 0 days.

(21) Appl. No.: 13/725,450

(22) Filed: Dec. 21, 2012

(65) Prior Publication Data

US 2013/0189179 A1    Jul. 25, 2013

Related U.S. Application Data

(60) Provisional application No. 61/579,451, filed on Dec. 22, 2011.

(51) Int. Cl.
| | | |
|---|---|---|
| *C01B 31/02* | (2006.01) | |
| *B01J 19/08* | (2006.01) | |
| *H05B 7/109* | (2006.01) | |
| *C01B 31/04* | (2006.01) | |

(52) U.S. Cl.
CPC ........ *C01B 31/0213* (2013.01); *B01J 2219/082* (2013.01); *B01J 2219/0809* (2013.01); *B01J 2219/083* (2013.01); *C01B 31/0226* (2013.01); *B01J 19/088* (2013.01); *H05B 7/109* (2013.01); *B01J 2219/0839* (2013.01); *B01J 2219/0815* (2013.01); *B01J 2219/0869* (2013.01); *B01J 2219/0879* (2013.01); *C01B 31/0206* (2013.01); *C01B 31/0446* (2013.01); *Y10S 977/842* (2013.01)

USPC .................. 423/445 B; 977/842; 423/447.1; 423/447.3

(58) Field of Classification Search
CPC ............ C01B 31/0206; C01B 31/0213; C01B 31/0226; C01B 31/0446; H05B 7/109; B01J 2219/0869; B01J 19/088; B01J 2219/082; B01J 2219/0809; B01J 2219/0879; B01J 2219/083; B01J 2219/0839; B01J 2219/0815; B02Y 40/00
USPC ................. 423/447.3, 447.1, 445 B; 977/842
See application file for complete search history.

(56) References Cited

U.S. PATENT DOCUMENTS

| 5,227,038 A | 7/1993 | Smalley et al. | |
|---|---|---|---|
| 2011/0256049 A1 * | 10/2011 | Dickinson et al. | 423/445 R |

FOREIGN PATENT DOCUMENTS

WO     WO2012040303 A1 *  3/2012

OTHER PUBLICATIONS

Author Unknown, "NIU Scientists Discover Simple, Green and Cost-Effective Way to Produce High Yields of Highly Touted Graphene", The Journal of Materials Chemistry, Jun. 20, 2011, 1 page.

* cited by examiner

*Primary Examiner* — Richard M Rump
(74) *Attorney, Agent, or Firm* — Withrow & Terranova, P.L.L.C.

(57) ABSTRACT

An apparatus for producing high yields of carbon nanostructures is disclosed. The apparatus includes an electric arc furnace and a feeder that directs solid carbon dioxide into an electrical arc generated by the electric arc furnace.

3 Claims, 6 Drawing Sheets

CARBON NANOSTRUCTURES

GRAPHENE

BUCKMINSTERFULLERENE

CARBON NANOTUBE

METHOD AND APPARATUS FOR PRODUCING HIGH YIELDS OF CARBON NANOSTRUCTURES

RELATED APPLICATIONS

This application claims the benefit of U.S. provisional patent application No. 61/579,451, filed Dec. 22, 2011, the disclosure of which is incorporated herein by reference in its entirety.

FIELD OF THE DISCLOSURE

The present disclosure relates to a method and apparatus for producing high yields of carbon nanostructures.

BACKGROUND

In the past few years there has been large scale research conducted pertaining to the industrial production of carbon nanostructures for commercial purposes. Carbon nanostructures include buckminsterfullerenes such as $C_{60}$, carbon nanotubes and graphene. These carbon nanostructures are expected to provide huge commercial value for electronics and energy infrastructure. As a result, billions of dollars are currently being spent globally on research on how to commercially produce carbon nanostructures in large quantities. At present, the most important carbon nanostructure for commercialization is graphene, which is a one-atom thick crystal structure made up exclusively of very strongly bonded carbon atoms. Graphene is reported by Rice University to be very useful as a constituent of oil drilling fluid due to its lightweight and incredible strength. Therefore, the oil drilling industry will have a demand for industrial quantities of graphene.

Recently, scientists at Northern Illinois University (NIU) produced relatively high yields of graphene by burning magnesium metal in dry ice. Dry ice is solid carbon dioxide that exists at a relatively cold temperature of −78° C. (−109° F.) at atmospheric pressure. Although the NIU scientists produced relatively high yields of graphene they state that the process by which graphene is synthesized using their technique is not clearly understood. According to the NIU scientists this is because the NIU process involves both a chemical reaction and a physical reaction. In particular, the chemical reaction yields magnesium oxide (MgO) and solid carbon (i.e., graphene). The NIU scientists speculate that the physical reaction results from a temperature of at least 3100° C. (5612° F.), which in turn may cause $sp^2$ carbon atoms in the dry ice to have such a low retention time that graphene, instead of graphite, is formed.

Relatively small quantities of carbon nanostructures for experimental purposes can be synthesized with a known carbon arc technique. As stated above, it is also recently known that the NIU technique of burning magnesium metal in dry ice potentially produces carbon nanostructures with relatively high yields. However, neither of these techniques is completely satisfactory in producing industrial quantities (i.e., tons) of carbon nanostructures. For example, the existing carbon arc technique is not scalable to produce industrial quantities of carbon nanostructures due to inefficiency. On the other hand, the technique of burning magnesium metal in dry ice produces the unwanted by-product of MgO that must be removed in a costly process. What is needed is a process that efficiently produces large quantities of carbon nanostructures without producing unwanted by-products such as MgO.

SUMMARY

The present disclosure provides a method and apparatus for producing industrial quantities (i.e., kilograms to metric tons) of carbon nanostructures by exposing solid carbon dioxide (dry ice) to an electric arc. In one embodiment, the disclosed apparatus is an electric arc furnace having an extruder or feeder that directs solid carbon dioxide directly into the flame of the electric arc. In at least one embodiment, the apparatus further includes a fluid transporter and conduit for collecting carbon nanostructures resulting from a physical reaction between the solid carbon dioxide and the flame of the electric arc. In at least one other embodiment, the feeder for the solid carbon dioxide is cryogenically cooled to prevent the solid carbon dioxide from significantly sublimating to gas before exiting the feeder. In yet another embodiment, a gas is directed into the electric arc to control development of the carbon nanostructures.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

Figure 1:
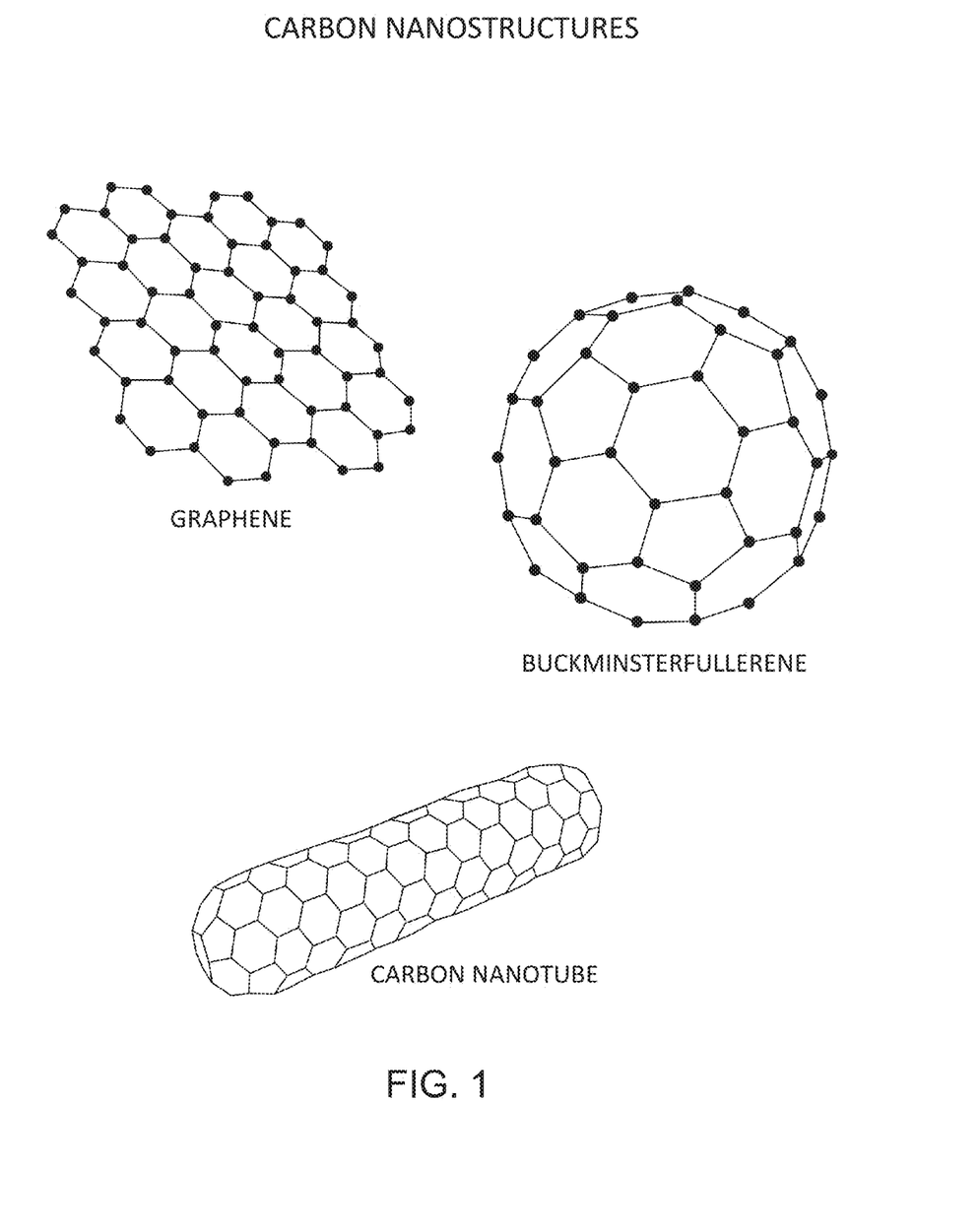
FIG. 1 is a diagram of an exemplary set of carbon nanostructures that are synthesizable using the method and apparatus of the present disclosure.

Embodiments disclosed in the detailed description relate to a method and apparatus for producing high yields of carbon nanostructures. FIG. 1 is a diagram showing an exemplary set of carbon nanostructures that are synthesizable using the method and apparatus of the present disclosure. As shown in FIG. 1, the carbon nanostructures producible using the disclosed method and apparatus includes but are not limited to buckminsterfullerenes, carbon nanotubes, and graphene including multilayer graphene. Other carbon nanostructures include nanodiamonds and carbon nanoscrolls. Moreover, additional carbon nanostructured based materials such as graphene oxide may also be produced by introducing gas such as gaseous oxygen.

Figure 2:
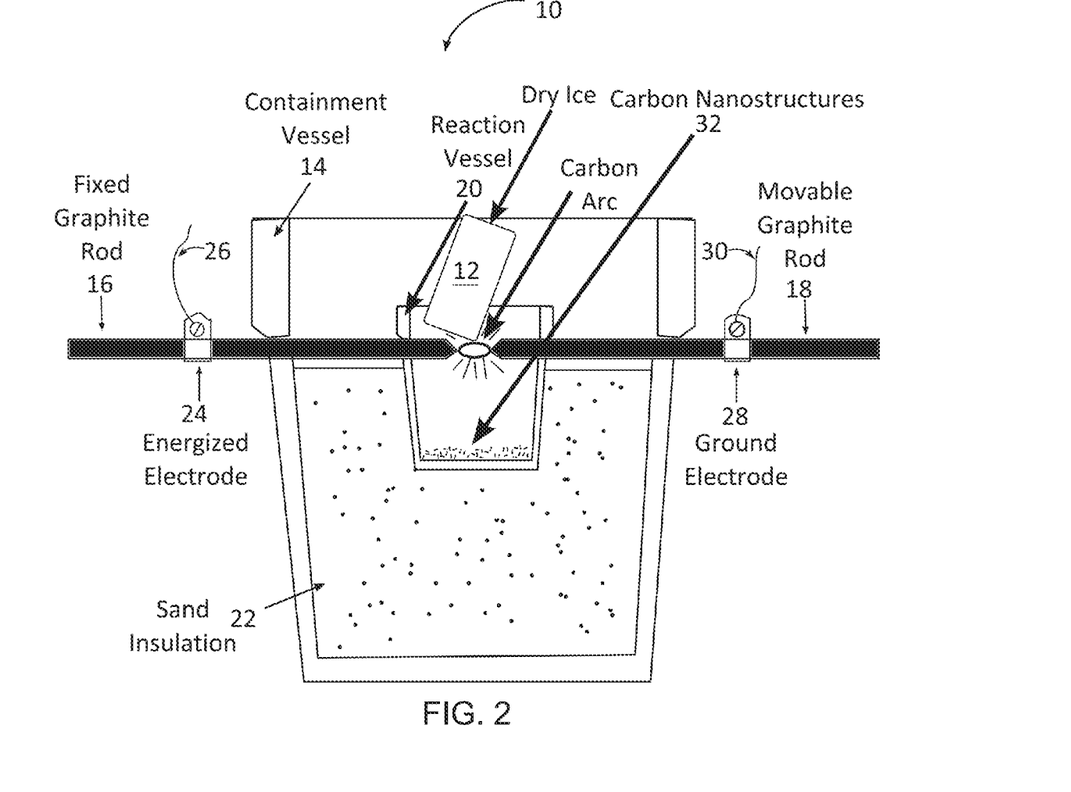
FIG. 2 is a cross-sectional view of a small scale version of the present apparatus that produces on the order of grams of carbon nanostructures by exposing solid carbon dioxide to a carbon arc.

FIG. 2 is a cross sectional view of a small scale apparatus 10 in accordance with the present disclosure. The small scale apparatus 10 is usable to physically react solid carbon dioxide 12 with an extremely high temperature carbon arc (>3100° C.). The apparatus 10 comprises an outer clay pot, which serves as a containment vessel 14 that is also used to align a fixed graphite rod 16 with a movable graphite rod 18. The fixed graphite rod and movable graphite rod each have a diameter of around 13 mm and a length of around 155 mm. A smaller inner clay pot is used as a physical reaction vessel 20. Ordinary beach sand 22 is usable as insulation between the containment vessel 14 and the physical reaction vessel 20. The beach sand 22 also serves to hold the reaction vessel 20 at a proper height to align the fixed graphite rod 16 and the movable graphite rod 18.

Holes through the sides of the containment vessel 14 and the reaction vessel 20 are usable to hold the fixed graphite rod 16 and the movable graphite rod 18 so that they can be extended into the reaction vessel 20. The fixed graphite rod may be fixed to the containment vessel 14 using fasteners (not shown). The fixed graphite rod 16 has attached an energized electrode 24 that is electrically connected to the positive terminal of the electric welder through an insulated positive cable 26. The energized electrode 24 is only truly energized when a connected electric power source is switched on. The movable graphite rod 18 includes a ground electrode 28 that is connected to a ground terminal of the electric power source through an insulated ground cable 30. A suitable electric power source for the small scale apparatus is an electric welder that sources in the range of 30 A to 75 A at 60V to 115V. Moreover, the electric power source can provide alternating current (AC) or direct current (DC).

The movable graphite rod 18 has a detachable insulated clamp that serves as a handle for moving the movable graphite rod 18 back and forth to "strike an arc." When synthesizing carbon nanostructures 32, a consumable dry ice block is placed on top of the fixed 16 and movable graphite rods 18 within the reaction vessel 20. The distance between the ends of the movable 18 and fixed graphite rods 16 with a carbon arc in FIG. 1 is exaggerated for illustration. In actuality, the ends of the movable 18 and fixed graphite rods 16 of the small scale apparatus are only millimeters apart when the carbon arc is burning its hottest. As the solid carbon dioxide 12 is consumed, carbon nanostructures fall under the force of gravity as well as are carried by falling currents of $CO_2$ gas to the bottom of the reaction vessel.

In operation, the apparatus of FIG. 2 is assembled outdoors on a concrete pad away from combustible material. The switch of the electric power source is verified to be in the off position. Also, a current limit of the electric power source is set to its lowest setting of 30 A. Before energizing the electrical power source, the positive cable of the electric power source is connected to the energized electrode. Next, the negative cable of the electric power source is connected to the ground electrode of the movable graphite rod. Welding gloves are donned and a solid carbon dioxide block 12 about 1"×3"×5" is placed on top of the ends of the fixed 16 and movable graphite rods 18 within the reaction vessel 20.

At this point, an operator dons a welding helmet having a carbon arc grade filter. The operator then makes ready the movable graphite rod 18 and the electric power source is energized so that a carbon arc may be struck. During a carbon nanostructures synthesis run, the operator brings the ends of the movable 18 and fixed graphite rods 16 together within the reaction vessel 20 and then pulls them slightly apart (e.g., a few mm) to generate a carbon arc. The carbon arc is allowed to continue as the dry ice is consumed. Using the small scale apparatus of FIG. 2, the solid carbon dioxide 12 takes on the order of a couple of minutes to be eroded almost through. Once the solid carbon dioxide 12 is practically eroded through, the electric power source is de-energized and a fresh block of solid carbon dioxide 12 is added onto the ends of the movable 18 and fixed graphite rods 16 and the process is repeated until the fresh block of solid carbon dioxide 12 is nearly eroded through. Additional blocks of solid carbon dioxide 12 are processed in the same manner until a desired amount of carbon nanostructures 32 are synthesized.

Figure 3:
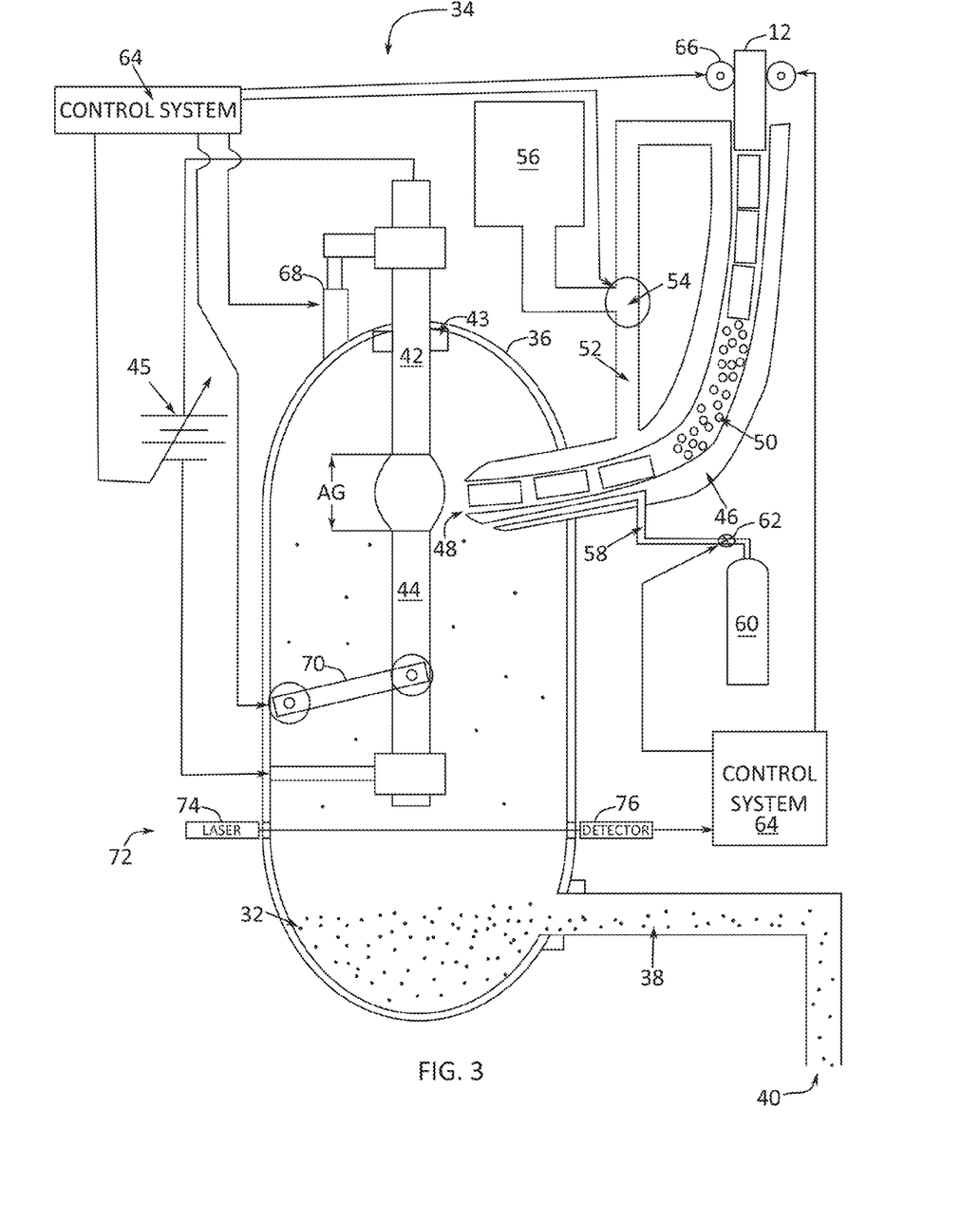
FIG. 3 is a cross-sectional view of an industrial scale apparatus for producing kilograms to metric tons of carbon nanostructures in a time scale of minutes to hours using the apparatus and method of the present disclosure.

FIG. 3 is a cross-sectional view of an industrial scale 34 apparatus for producing kilograms to metric tons of carbon nanostructures 32 on a time scale of minutes to hours using the apparatus 34 and method of the present disclosure. The industrial scale apparatus 34 includes a vessel 36 that can be a pressure vessel that can hold a regulated pressure environment that is significantly less than one atmosphere or significantly greater than one atmosphere. The vessel 36 is preferably a ceramic vessel that can withstand temperatures on the order of two to three thousand degrees Celsius. At least one conduit 38 for transporting synthesized carbon nanostructures 32 is coupled to over an outlet in the vessel 36. An exit 40 of the conduit is maintained at a lower pressure than a pressure within the vessel 36 so that synthesized carbon nanostructures are urged to exit the vessel 36 through the conduit 38. The conduit 38 directs the synthesized carbon nanostructures 32 into a collection bin (not shown). Additional conduits 38 can tap the vessel 36 at various locations to collect lighter or heavier carbon nanostructures 32

A first electrode 42 extends through a seal 43 into the vessel 36. A second electrode 44 is mounted within the vessel 36 and is longitudinally aligned with the first electrode 42. The first electrode 42 and the second electrode 44 are preferably made of graphite. A large industrial scale apparatus of the present disclosure can accommodate a graphite electrode diameter of at least 800 mm to carry around 160 kA when energized by a DC power source 45. A medium industrial scale apparatus 34 according to this disclosure can accommodate a graphite electrode diameter of around 350 mm to support an arc gap (AG) of at least 20 cm. In this way, it is estimated that a volume of solid carbon dioxide 12 on the order of 20 cm by 35 cm by 35 cm may be synthesized into carbon nanostructures 32 at a rate measured in seconds or less depending upon the electrode current. In one embodiment the arc gap is greater than around about 10 cm. In yet another embodiment, the arc gap is greater than around about 20 cm. In still another embodiment, the arc gap is greater than around about 100 cm.

A feeder conduit 46 for transporting solid carbon dioxide 12 to between the ends of the first electrode 42 and the second electrode 44 has a nozzle 48 that preferably extends into the vessel 36. In this way, solid carbon dioxide 12 can be exposed directly to an electrical arc that forms between the first electrode 42 and the second electrode 44. In operation, the nozzle 48 is usable to extrude and/or direct solid carbon dioxide blocks 12 into the electric arc generated between the first electrode 42 and the second electrode 44. The nozzle 48 is also usable to direct propelled solid carbon dioxide pellets 50 into the electric arc generated between the first electrode 42 and the second electrode 44. The feeder conduit 46 is preferably a high temperature ceramic or graphite structure that is fabricated to include a channel for guiding the solid carbon dioxide 12 from a source bin or container to the electric arc.

The solid carbon dioxide pellets 50 may propelled through the nozzle 48 using a pressurized fluid such as air, nitrogen, gaseous carbon dioxide, etc. It is to be understood that the solid carbon dioxide blocks 12 and/or pellets 50 can be gravity fed into the electric arc without deviating from the scope of the present disclosure.

In one embodiment, the feeder conduit 46 is also fabricated to include at least one channel 52 for directing a cryogenic fluid such as liquid nitrogen through the feeder conduit 46. A cryogenic pump 54 circulates the cryogenic fluid from a cryogenic reservoir 56 through the at least one channel 52 in the feeder conduit 46 to prevent sublimation of the solid carbon dioxide 12 before it exits the nozzle 48. It is believed that hydrogen introduced as a gas during the synthesis of graphene forms on the edges of graphene resulting in higher quality graphene. Therefore, it is preferable for the feeder conduit 46 to include a gas conduit 58 with an orifice to direct a gas such as hydrogen to aid in developing higher quality carbon nanostructures 32 such as graphene. A gas source 60 can hold various gases and gas mixtures. A gas valve 62 is controlled by the control system 64 to control a flow of gas into the reaction vessel 36. Moreover, oxygen introduced as a gas during the synthesis of graphene is usable to produce graphene oxide. It should be understood that the introduction of other gases or gas mixtures can be introduced without deviating from the scope of the present disclosure.

A control system 64 controls a drive mechanism 66 that urges the solid carbon dioxide 12 through the feeder conduit 46 to exit the nozzle 48 at a desired feed rate. The feed rate of the solid carbon dioxide 12 is automatically adjustable by the control system 64 to match the consumption rate of the solid carbon dioxide 12 in the electric arc. The control system 64 is programmable to also adjust the feed rate to maximize a synthesis rate of a predetermined carbon nanostructure 32. In other words, the feed rate of the solid carbon dioxide 12 is adjustable along with electrode current and/or other parameters to favor the synthesis of one type of carbon nanostructure 32 over another by a predetermined ratio such as 2:1 and above 18. In one embodiment, a synthesis of a volume of buckminsterfullerenes is greater than a simultaneous synthesis of a volume of other carbon nanostructures by a predetermined ratio. In another embodiment, a synthesis of a volume of graphene is greater than a simultaneous synthesis of a volume of other carbon nanostructures by a predetermined ratio. In yet another embodiment, a synthesis of a volume of carbon nanotubes is greater than a simultaneous synthesis of a volume of other carbon nanostructures by a predetermined ratio.

For example, a solid carbon dioxide 12 feed rate that favors the production of carbon nanotubes over Buckminsterfullerenes is programmable in a memory of the control system 64. The control system 64 can also be programmed to control a rate at which the cryogenic fluid is pumped though the at least one channel of the feeder conduit 46. It is to be understood that the control system 64 may comprise a digital computer with input/output (I/O) interface lines for control signals and random access memory for data and software, a microcontroller with firmware and I/O interface lines, or field programmable logic arrays (FPGA) with memory and I/O interfaces or combinations thereof.

A hydraulic servo system 68 is usable to partially extend and partially extract first electrode 42 within the vessel 36. During operation, the control system 64 using a sensible feedback such as electrode current draw and/or electric arc light production commands the hydraulic servo 68 to continuously adjust the position of the first electrode 42 relative to the second electrode 44 to maintain the electric arc. An electric servo mechanism 70 is usable to periodically adjust the position of the second electrode 44 in relationship to the nozzle 48 of the feeder conduit 46. This action is needed as the second electrode 44 will erode in length over time. The control system 64 also controls the amount of current flowing through the electric arc gap. This can be accomplished in ways know to those skilled in the art. At least one way, to control the current flowing through the electric arc is by adjusting the amount of voltage applied across the first electrode 42 and the second electrode 44. FIG. 3 shows the control system 64 in control of a DC electric power source 45, but the control system 64 can control the average AC voltage output from an AC electric power source as well.

An optical system 72 aligned through viewports is usable to detect and estimate the volumetric rate of carbon nanostructure 32 being synthesized at any given moment. For example, a laser beam from a laser 74 is projected across the vessel 36 to a laser detector 76 can be monitored for dispersion and/or absorption by synthesized carbon nanostructures to provide control feedback to the control system 64. If the rate of carbon nanostructure 32 synthesis drops below a predetermined level, the control system 64 will adjust any number of a variety of controllable parameters such as solid carbon dioxide feed rate, electrode current draw and gap AG in order to bring the synthesis rate of the carbon nanostructures 32 back up to the predetermined level.

It is to be understood that the apparatus of the present disclosure can operate with a electrode such that an electrical arc is maintained between a gap that separates the single carbon electrode from a pool of molten metal. In this way, carbon nanostructures can be synthesized and added to the molten metal in a single operation. Moreover, the electrode can include an internal conduit for gravity feeding solid carbon dioxide into an electrical arc between the electrode and another electrode or molten metal.

Figure 4:
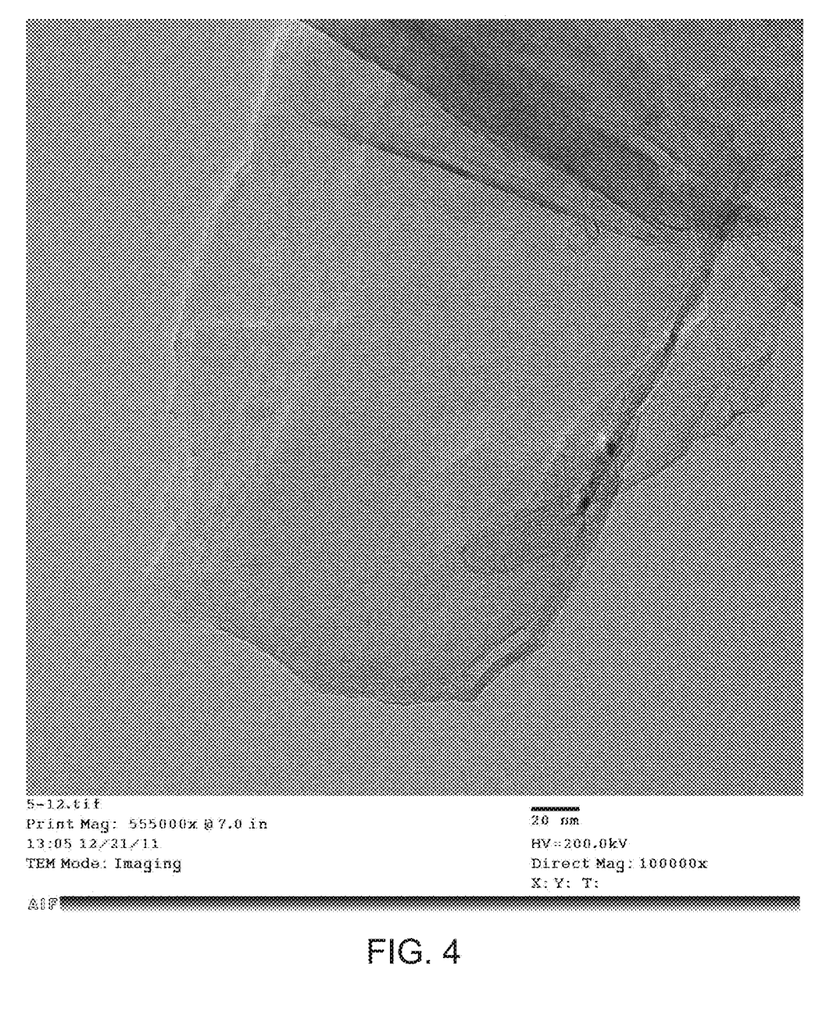
FIG. 4 is a transmission electron microscope (TEM) image of graphene sheets synthesized by a method of the present disclosure.
Figure 5:
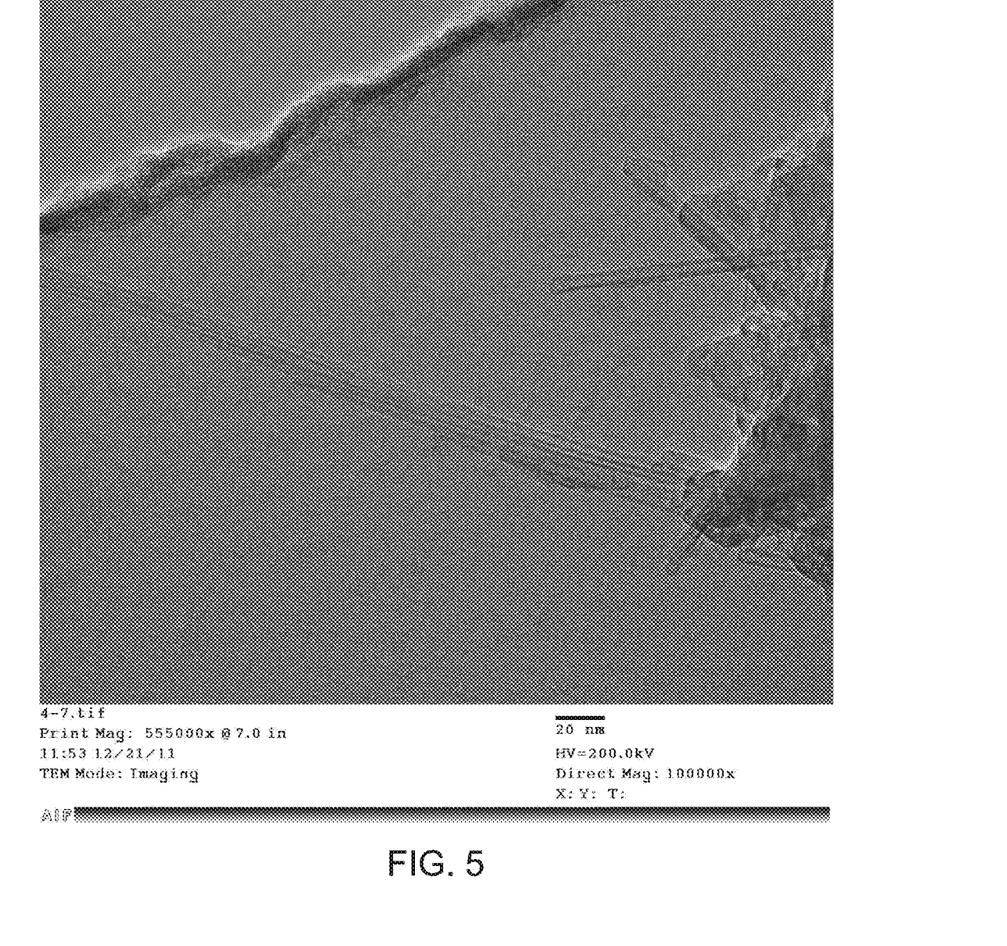
FIG. 5 is a TEM image of carbon nanotubes synthesized by the method of the present disclosure.
Figure 6:
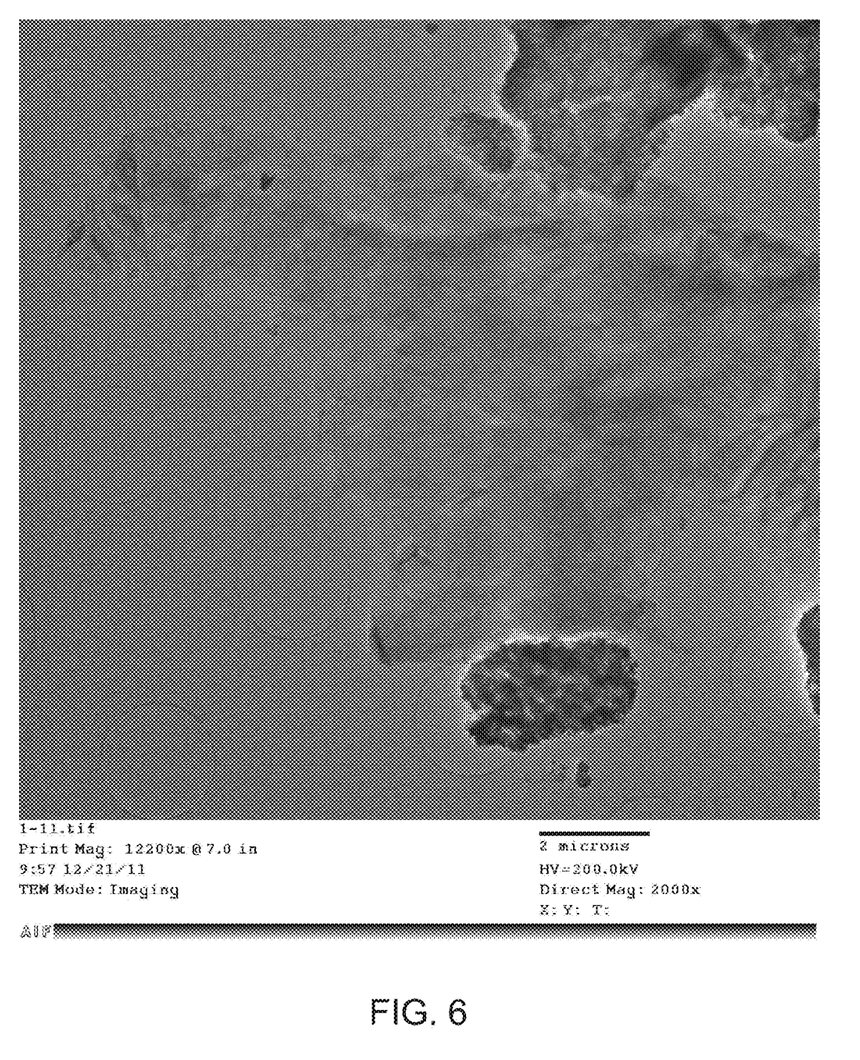
FIG. 6 is a TEM image of a relatively large graphene sheets synthesized by the method of the present disclosure.

FIG. 4 is a transmission electron microscope (TEM) image of graphene sheets synthesized by a method of the present disclosure. FIG. 5 is a TEM image of carbon nanotubes synthesized by the method of the present disclosure. FIG. 6 is a TEM image of a relatively large graphene sheets synthesized by the method of the present disclosure.

Those skilled in the art will recognize improvements and modifications to the embodiments of the present disclosure. All such improvements and modifications are considered within the scope of the concepts disclosed herein and the claims that follow.

What is claimed is:

1. A method of synthesizing carbon nanostructures comprising:
   Providing an electric arc; and
   Placing dry ice into the electric arc to physically react the dry ice with the electric arc without producing MgO wherein a synthesis of a volume of graphene is greater than a simultaneous synthesis of a volume of other carbon nanostructures by a ratio of 2:1 or above.

2. A method of synthesizing carbon nanostructures comprising:
   Providing an electric arc; and
   Placing dry ice into the electric arc to physically react the dry ice with the electric arc without producing MgO wherein a synthesis of a volume of carbon nanotubes is greater than a simultaneous synthesis of a volume of other carbon nanostructures by a ratio of 2:1 or above.

3. A method of synthesizing carbon nanostructures comprising:
  Providing an electric arc; and
  Placing dry ice into the electric arc to physically react the dry ice with the electric arc without producing MgO wherein a synthesis of a volume of buckminsterfullerenes is greater than a simultaneous synthesis of a volume of other carbon nanostructures by a ratio of 2:1 or above.

* * * * *